United States Patent Office

3,813,334
Patented May 28, 1974

3,813,334
POROUS BACKING MATERIAL FOR SEMI-PERMEABLE MEMBRANE CARTRIDGES
Donald T. Bray, Escondido, Calif., assignor to Desalination Systems, Inc., Escondido, Calif.
Filed Apr. 9, 1973, Ser. No. 349,072
Int. Cl. B01d 13/00
U.S. Cl. 210—321                                8 Claims

ABSTRACT OF THE DISCLOSURE

A backing material comprising two layers of ribbed fabric arranged in rib face to rib face relationship with the ribs substantially parallel in the direction of spiral winding, the width of the grooves in each layer of ribbed fabric being less than the width of the ribs in the opposite fabric layer, is employed for transfer of product liquid to a central collecting tube in a spiral wound cartridge for use in reverse osmosis or ultrafiltration apparatus. This provides excellent fluid transfer through the longitudinal grooves in the ribbed fabric layers; the greater width of the ribs prevents these from intruding into the grooves of the opposite fabric layer and restricting flow. Preferably the ribbed fabric is of tricot woven from a synthetic fiber and impregnated with a reinforcing resin, with grooves and ribs in each fabric layer being of substantially the same dimensions as the respective grooves and ribs in the other fabric layer.

BACKGROUND OF THE INVENTION

(1) Field of the invention

This invention relates to improvement in the porous backing material providing liquid transport to a central collector in a spiral wound semipermeable membrane cartridge useful particularly for reverse osmosis or ultrafiltration.

(2) The prior art

Prior art reverse osmosis modules of the spiral wound type have employed various materials as backing for semipermeable membranes wound together with brine side spacers into a spiral assembly. One type of backing material comprises particles of an incompressible substance such as glass beads attached to a porous substrate as described in Pat. No. 3,367,505. Another type of backing material is a melamine impregnated tricot which when used as a single layer requires a relatively rigid overlay to prevent the semipermeable membrane covering the rib face from intruding into the tricot grooves and restricting flow, and also to prevent deleterious effects on membrane operating efficiency due to distortion or rupture. It has been suggested to use a double layer of tricot with the ribbed sides face to face but with the ribs on opposite faces at right angles to each other as described on p. 21 of Office of Saline Water Research and Development Progress Report No. 313. Such a right angle arrangement of tricot ribs provides some increased flow of product liquid compared to a single layer, but the comparatively small cross over areas of the ribs results in concentration of pressure effects at these points and eventual permanent reduction in thickness with corresponding reduction of channel dimensions and fluid flow. Additionally, while one set of grooves between ribs will be longitudinally arranged with respect to the direction of travel of the liquid around the spiral toward the central collector, the other set of grooves will be right angles to the flow direction and will contribute little to direct flow volume. The principal advantage of this type of double tricot layer is that the assembly presents relatively smooth (not ribbed) outside surfaces for membrane support.

The porous backing material of this invention overcomes the disadvantageous compaction and inherent flow restrictions of the double layer fabric with crossed ribs in facing layers, while retaining relatively smooth outer surfaces for membrane support. It provides substantially enhanced flow and uniform channels for longitudinal transfer of liquid through membranes on each side of a double layer backing material assembly.

SUMMARY OF THE INVENTION

Summarized briefly, this invention provides a porous backing material for use in a spiral wound semipermeable membrane cartridge, comprising also membrane leaves and brine channel spacers, this backing material comprising two layers of ribbed fabric having a ribbed face and a smooth face, these two layers being arranged in rib face to rib face relationship with the ribs in both layers substantially parallel to each other and parallel to the direction of liquid flow to the central collection tube. Additionally, and of essential importance, is that the ribs on each fabric face are wider than the width of the grooves in the facing fabric surface. Preferably the widths of the grooves and the ribs are respectively the same for both layers of fabric, with the ribs being wider than the grooves in both fabric layer surfaces. Preferably, the ribbed fabric is woven of a pressure resistant synthetic fiber such as polyester impregnated with resin and in which the ribs are from about 0.005 to 0.015 inch wide, the grooves being between about 0.003 and 0.007 inch wide. The transverse open area, or pore area, through the ribbed fabric, should be from about 30% to 50% to provide adequate liquid flow to the interior channels while retaining sufficient material bulk for strength and pressure resistance.

BRIEF DESCRIPTION OF THE DRAWINGS

Construction and operation of the backing material of this invention will be more readily understood by reference to the following description and to the annexed drawings in which.

DESCRIPTION OF PREFERRED EMBODIMENTS

Figure 1:
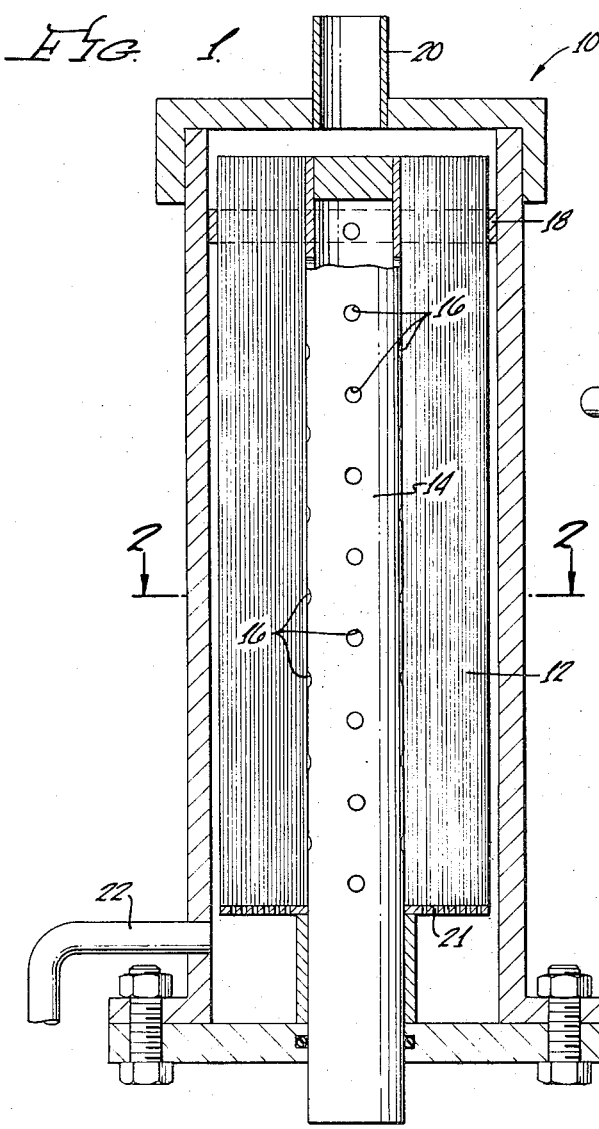
FIG. 1 shows a central vertical section of a reverse osmosis or ultrafiltration module employing the backing material of this invention.

Referring now to FIG. 1, the module 10 contains a spiral wound cartridge 12 which is formed, as hereinafter explained, by winding a pack or envelope comprising membrane leaves, brine channel spacers, backing material and overlays (as hereinafter described) around a central collection tube 14 provided with apertures 16 which communicate with the backing material in the cartridge 12. Cartridge 12 is sealed from the sidewalls of module 10 as by a gasket 18 so that flow of feed liquid longitudinally through cartridge 12 entering at 20 will result in separation of a purified product liquid collected in tube 14 the cartridge 12 being maintained in place by perforated plate 21. The brine or blowdown, now more concentrated with respect to the solute, or solids, in the original feed water, leaves the module 10 through outlet pipe 22.

Figure 2:
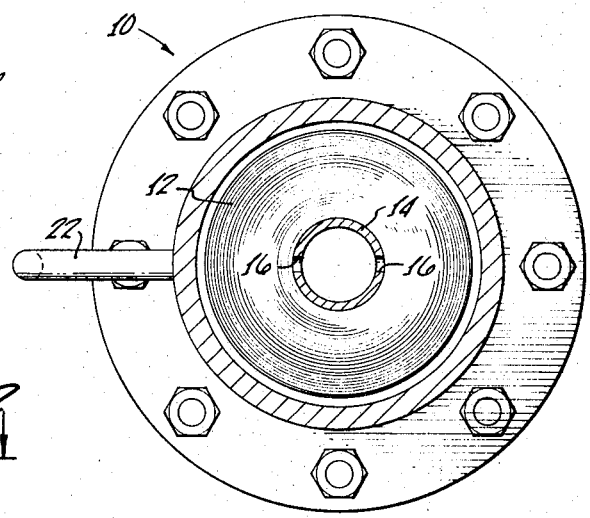
FIG. 2 shows a horizontal cross section of the module of FIG. 1 taken along the line 2—2.
Figure 3:
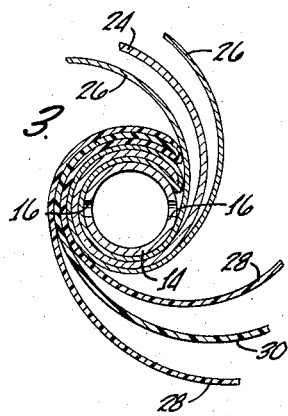
FIG. 3 shows the method by which the backing material, the membranes and the brine side spacer are arranged for spiral winding to form a cartridge for use in the module of FIG. 1.

In FIGS. 2 and 3 are shown the elements making up the spiral wound pack which are, as shown, the backing material 24 which has felt overlays 26 on each side to provide a sufficiently smooth yet porous support for the membrane leaves 28. These are glued and sealed around their edges, and in between wound layers is a sheet 30 of coarse open weave plastic mesh which acts as a brine side spacer to provide passage for feed liquid to the surfaces of membrane leaves 28. The purified liquid passes through the membrane leaves 28, the overlays 26, then longitudinally down the channels of backing material 24, and through holes 16 to be collected in central collection tube 14. FIG. 3 shows a horizontal cross section of the module 10 as it appears with the elements shown in FIG. 2 spirally wound and placed inside module 10.

Figure 4:
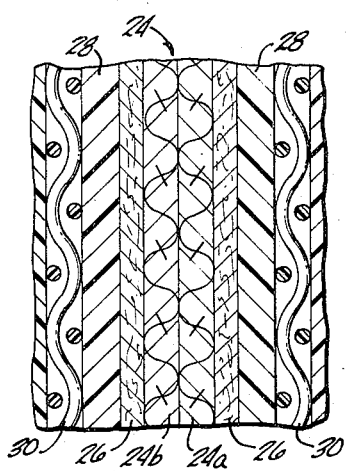
FIG. 4 shows a fragmentary and much enlarged portion of the cartridge of FIG. 1 as a central vertical section.
Figure 5:
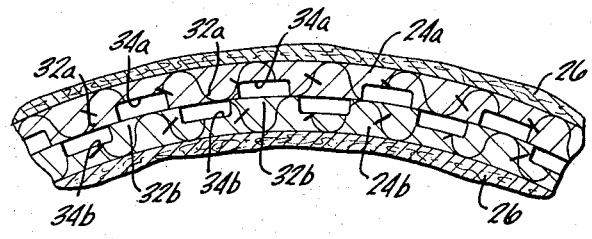
FIG. 5 shows a fragmentary much enlarged portion of the horizontal cross section of the cartridge shown in FIG. 2, illustrating particularly a backing material channel arrangement.

Referring now particularly to FIGS. 4 and 5 the backing material 24 according to this invention comprises two sheets of ribbed fabric 24a and 24b each having a ribbed face and a smooth face, and which are arranged in rib face to rib face relationship with the ribs in both layers substantially parallel to each other and also essentially parallel to the direction of spiral winding and to the direction of flow of liquid to the central collection tube 14. Thus it will be seen that fabric layers 24a and 24b have ribs 32a and 32b and intervening grooves 34a and 34b respectively. An essential feature of the invention is that the ribs, for example 32a and 32b, are wider than the grooves in the facing surface of fabric, such as grooves 34a and 34b. The fabric ribs lie parallel to each other and essentially parallel to the direction of product water flow toward the cartridge central collection tube 14.

Conveniently the two fabric layers will be made from the same type of fabric, and the ribs and grooves in each fabric layer will be of respectively the same width as those in the other layer, with the width of the ribs in each layer being greater than the width of the grooves. Arrangement of the two fabric layers so that the ribs and grooves are all parallel provides full open groove channels in both fabric layers. This will result in substantially double the liquid carrying capacity of the groove in a single fabric layer. When the grooves are all parallel to the direction of water flow the shortest path of greatest cross sectional area is provided for travel of product water passed through the semipermeable membrane and porous overlay to the central collection tube. The feature which makes practical the parallel rib arrangement, is that the width of the ribs in the fabric layers are, as described, wider than the width of the grooves they face. This makes it impossible for a rib on the face of one fabric layer to intrude to any deleterious degree into the groove in the facing layer surface. Thus substantially the full channel cross sectional area is preserved for both fabric layers no matter how the ribs and grooves in opposing faces may lie with respect to each other. If the ribs of one layer lap over part way across the groove in the opposite layer face, there may be some slight distortion in this area but inter-meshing of ribs and grooves cannot occur to close off any groove channels because the ribs are wider than the channels and intrusion of this type is impossible. Therefore precise register of ribs and grooves in the two fabric layers is not necessary.

The ribbed fabric suitable for producing the backing material of this invention may be of any ribbed fabric, such as tricot, serge or twill. Tricot is preferred since this can be obtained as warp knitted cloth having a ribbed face and a smooth face and having a high transverse porosity of preferably between about 30% and 50%. Preferably the ribbed fabric should be woven of yarn or thread which is strong and pressure resistant, and also resistant to solutions, principally, aqueous solutions, which may be treated in the module. Polyester fabrics such as produced from Dacron (trademark) are strong and resistant to solutions normally employed, and Dacron tricot is a most desirable fabric. To increase resistance to deformation under pressure the ribbed fabric may be impregnated with a synthetic resin such as melamine or epoxy. Impregnation can be accomplished by immersing the fabric in a solution of resin in a volatile solvent which is evaporated to leave the resin in the fabric fibers, and without flooding or deleterious filling of the fabric transverse interstices. The impregnated fabric can be cured for a time and at a temperature suitable for the type of resin employed. For example a 67% solution of melamine (Perez 613) in water can be employed. The cloth is immersed in the solution, allowed to drain and dry, and then cured at about 190° C. for a period of 30 minutes.

Treatment of ribbed fabric with reinforcing resin is discused in the Final Report to Office of Saline Water under Contract 14–01–0001–1745 by Gulf General Atomic Inc., May 1969.

The overlays 26 are preferably employed against the outer or back surfaces of the ribbed fabric backing material, which are smooth in the sense that they are not ribbed, to provide a sufficiently smooth and even porous surface for membrane support. Polyester cloth such as a felt of Dacron sold commercially as Reemay 0601 may be successfully used.

The brine side spacer 30 may be fabricated of 0.15 inch polyethylene fibers formed into a 12 x 12 square mesh or weave about 0.030 inch thick, and commercially sold under the trade name Vexar.

As has been pointed out above the comparative dimensions of the ribs and grooves in the backing material are critical to prevent intrusion and impediment to liquid flow. The actual dimensions, which may be generally from about 0.003 to 0.007 inch for the groove width and from about 0.005 to 0.015 inch for the ribs, provide a material with an adequate number of flow channels each of relatively small cross section area so that the backing material is stable under high pressure when used in reverse osmosis and ultrafiltration processes. A preferred groove width of about 0.005 inch and a rib width of about 0.007 inch provides excellent flow characteristics as well as a rib width almost 50% greater than the groove width, which ensures full advantage of this feature.

In operation the backing material of this invention will be employed in a spiral wound module, such as shown in FIG. 1. The feed inlet 20 of module 10 will be connected to a source of liquid to be treated which will be supplied under pressure suited for the reverse osmosis or ultrafiltration separation to be accomplished. Solution more concentrated with respect to solute or particulate material in the feed solution will be released through outlet pipe 22 which will normally be connected to a back pressure control valve or restrictor device to maintain operating pressure within module 10 while releasing the solution concentrate. Purified liquid passing through the semipermeable membrane in cartridge 12 will be collected and released through tube 14. In some instances in ultrafiltration use, the brine blowdown or solution concentrate flow may not be used and all the solvent will pass through the membrane with the retention of the particulate material as in an ordinary fiber.

The backing material of this invention is useful to provide excellent product liquid flow to a central collecting tube in a spiral wound reverse osmosis or ultrafiltration cartridge. The principal feature of the ribbed fabric in which the ribs are wider than the grooves between ribs makes possible assembly of a pair of facing fabric layers with the ribs parallel to each other. Under these conditions essentially the full cross sectional area of the grooves in both fabric layers is useful as fluid flow channel with substantial increase in liquid carrying capacity. Since the ribs are wider than the grooves it is not necessary that the ribs and grooves in facing fabric surfaces be registered so that ribs lie on ribs or that ribs cover grooves in the facing fabric. Although each of these arrangements will provide improved flow according to this invention it is significant that the ribs and grooves in the face of one fabric surface may lie in any lateral relationship to the ribs and grooves in the facing fabric surface without deleterious effect on efficiency. Since the ribs are wider than the grooves the ribs cannot intrude and mesh into facing grooves to block the channel cross section area and significantly impede liquid flow.

What is claimed is:

1. A spiral wound semipermeable membrane cartridge comprising membrane leaves, brine channel spacers, and porous backing material to transport liquid passing through the semipermeable membrane to a central collection tube; in which the improvement comprises:

(a) said porous backing material comprising two layers of ribbed fabric placed rib face to rib face with the ribs in both layers substantially parallel to each other and parallel to the direction of flow of liquid to the central collection tube, the ribs on each fabric face being wider than the width of the grooves in the facing fabric face.

2. A cartridge according to claim 1 in which the respective width of the ribs and the respective width of the grooves are substantially the same in both layers of fabric.

3. A cartridge according to claim 1 in which the ribbed fabric is tricot.

4. A cartridge according to claim 1 in which the ribbed fabric is polyester tricot.

5. A cartridge according to claim 1 in which the grooves in said ribbed fabric are from about 0.003 to 0.007 inch wide and the ribs in said ribbed fabric are about 0.005 to 0.015 inch wide.

6. A cartridge according to claim 5 in which said grooves in said ribbed fabric are about 0.005 inch wide and the ribs in said ribbed fabric are about 0.007 inch wide.

7. A cartridge according to claim 1 in which the transverse open area of said ribbed fabric is from about 30% to 50% of the area of said fabric.

8. A cartridge according to claim 1 in which the ribbed fabric is impregnated with a reinforcing resin.

References Cited

UNITED STATES PATENTS

| | | | |
|---|---|---|---|
| 3,076,554 | 2/1963 | Bub | 210—487 |
| 3,261,474 | 7/1966 | Parker et al. | 210—497 |
| 3,020,977 | 2/1962 | Huppke et al. | 210—494 |

FRANK A. SPEAR, Jr., Primary Examiner

F. LANDER, Assistant Examiner

U.S. Cl. X.R.

210—487, 494